Jan. 3, 1950 C. C. KOELN 2,493,674
DRAIN FOR VEHICLE VENTILATING WINDOWS
Filed Nov. 23, 1945 2 Sheets-Sheet 1
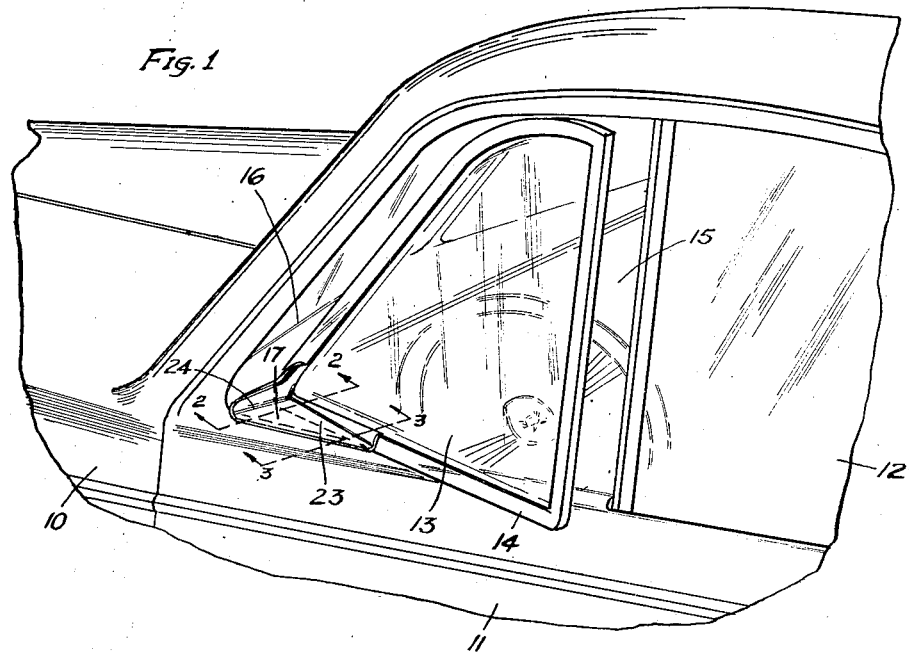
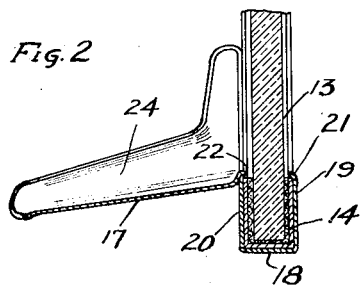
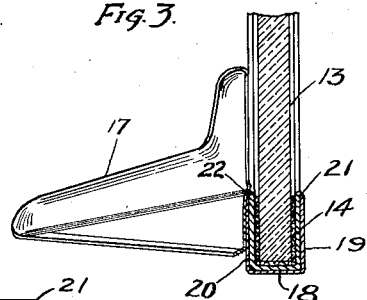
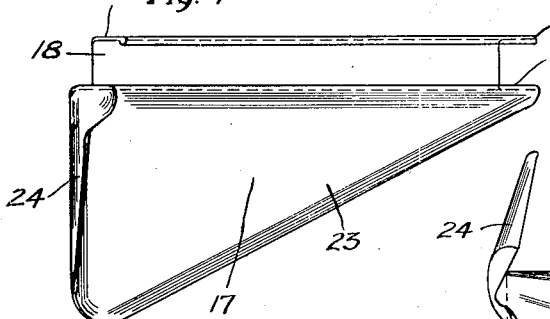
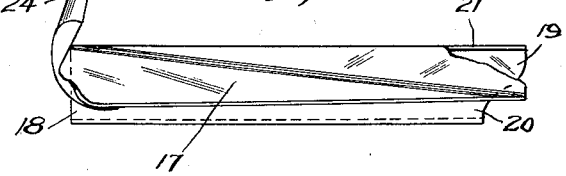
INVENTOR
CARL C. KOELN.
BY
*P. H. Lamphere*
ATTORNEY Jan. 3, 1950     C. C. KOELN     2,493,674
DRAIN FOR VEHICLE VENTILATING WINDOWS Filed Nov. 23, 1945     2 Sheets-Sheet 2

INVENTOR.
CARL C. KOELN.
BY
ATTORNEY.

Patented Jan. 3, 1950

2,493,674

UNITED STATES PATENT OFFICE 2,493,674

DRAIN FOR VEHICLE VENTILATING WINDOWS

Carl C. Koeln, St. Louis County, Mo.

Application November 23, 1945, Serial No. 630,459

14 Claims. (Cl. 296—44)

This invention relates to drains and more particularly to a drain structure for association with a ventilator panel.

In automobile windows, particularly those associated with doors and provided with separately swingable ventilator panels or sections for providing "no draft" ventilation, it is found very desirable to open such to some extent when driving in rainy weather in order to provide ventilation and more particularly to prevent fogging of the wind shield by the collection of moisture thereon. Under such conditions rain on the outside of the ventilator panel will drain or be forced by air currents off the glass at the forward end. This forward end projects into the interior of the body of the automobile when the ventilator panel is open, due to the particular pivotal arrangement of the panel, and consequently the draining water at the forward end drips into the interior of the body. The water may run down the covering fabric on the interior of the door, causing damage thereto, or if the ventilator panel is open wide enough it may drip onto clothing of an occupant sitting adjacent the window and thereby cause discomforture, together with soilage of the clothing.

One of the objects of my invention is to provide means for preventing the entry of water into the interior of an automobile, or other body structure, from a window ventilator panel when open during driving in rain.

Another object is to provide a drain surface for association with a pivoted ventilator panel of an automobile window which will be effective when the panel is open, to drain water from the forward end thereof to the exterior of the automobile body and thereby prevent dripping to occur on the inside of the body.

A further object is to provide a drain of the type referred to which will be effective to collect and drain water outwardly and rearwardly from the forward end of the ventilator panel.

A still further object is to produce a drain of the type referred to which can be constructed and sold as an attachment for existing window ventilator panels and which is so designed as to fit various existing panels.

Another object is to produce a drain of the type referred to which is simple in construction, economical to make, efficient in operation and which does not detract from the appearance of an automobile or other occupant carrying body structure.

Other objects of my invention will become apparent from the following description taken in connection with the accompanying drawings in which:

Figure 1 is a view of a portion of an automobile showing a window ventilator panel having associated therewith a drain embodying my invention;

Figures 2 and 3 are sectional views showing details of construction, said views being taken on the lines 2—2 and 3—3, respectively, of Figure 1;

Figure 4 is a top view of the drain per se;

Figure 5 is a side view of the drain per se with a portion broken away;

Figure 6:
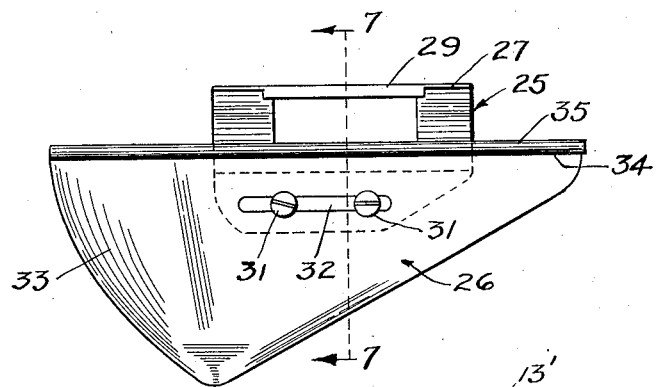
Figure 6 is a top view of a differently constructed drain which is adjustable to fit different panel designs.

Referring to the drawings in detail and first to Figure 1, the numeral 10 indicates an automobile body having a door 11 adjacent the driver's compartment. This door is provided with a roll down window panel 12 and a swingable ventilator panel or section 13 pivoted to the door at its top and bottom so that the front portion can swing inwardly and the rear portion can swing outwardly to provide what is called "no draft" ventilation for the interior of the automobile. The glass pane of this swingable panel has a metal frame 14. When the panel is swung to the open position out of the plane of the roll down panel 12, as shown in Figure 1, the stream of air passing along the side of the automobile will be deflected outwardly by the rear portion of the panel and cause air to be drawn out of the interior of the automobile through the opening 15 adjacent the roll down panel, as is well known to all drivers. As air is drawn out of the interior of the automobile through opening 15 some air will enter the opening 16 at the forward end of the swingable panel 13, thus causing air circulation in the automobile. The circulation of air, however, will be gentle and without any draft effects.

When the automobile is being driven in rain it is highly desirable to open the swingable panel 13 in order to provide ventilation and under certain atmospheric conditions absolutely necessary to prevent moisture from collecting on the windshield and causing it to become "fogged-up" if no defroster system is available or is not desired to be used because of unwanted heat. With the panel 13 open, under such conditions, rain striking and collecting on the forward end of this panel will run to the bottom of the panel and drip into the interior of the automobile or run down the inside of the door which, of course, is a condition not desirable. Even if rain does not strike the forward part of the panel, some rain nevertheless will be moved along the glass of the panel from the rearward by the flow of air into the interior of the automobile through opening 16. Thus dripping of water into the interior will result.

In order to prevent the undesirable dripping of water at the inwardly projecting end of the swingable panel, there is provided a specially constructed drain which may be built as a part of the frame of panel 13 or as an attachment as illustrated in the drawings. The drain 17, shown by way of example, is made from a suitable easily workable metal, but it is obvious other material can be employed such as moldable plastic. The drain, as shown in detail in Figures 2 to 5, has a U-shaped channel portion 18, the leg walls 19 and 20 thereof being provided, respectively, with inwardly extending ledges 21 and 22 at their top edges. The channel portion is of such width as to receive the U-frame 14 of the swingable ventilating panel with the ledges overlying the inner edges of the frame as best shown in Figures 2 and 3. The walls of the U-shaped channel portion are slightly flexible and thus the channel portion can be easily slid onto the forward end of the bottom part of the frame and locked into position.

The leg wall 20 of the U-shaped channel portion, which will be the outside wall when the channel portion is attached, has an extending integral drain portion 23 which is of general triangular shape, being wide at its forward end and narrow at its rear end. This portion slopes downwardly toward its outer free edge and also downwardly toward its narrow rear end. In order to provide for the rearward sloping of the extending portion, a part of it adjacent leg wall 20 is turned downwardly in a progressively greater degree from the forward end of the U-shaped channel portion to its rear end as shown. Thus any water collecting on the top drain surface of the extending portion 23 will run outwardly and rearwardly with respect to the U-shaped channel portion. However, when the drain is functioning with the panel 13 open, as shown in Figure 1, the flow of water will be generally outwardly with respect to the automobile body. The dimensions of the extending portion are such that when the drain is functioning with the panel 13 open to a considerable extent, it will completely cover the V-shaped lower part of the opening 16 between the frame 14 and the door and overlie the window ledge of the door to such an extent that water will drain down the exterior wall of the door.

In order to prevent any air coming into the body through opening 16 from pushing water over the forward end of the extending portion 23, there is provided a front wall portion 24 of general L-shape so that it will extend upwardly alongside of the forward part of the frame 14 of swingable panel 13 where the drain is attached. The wall 24 is curved so that its upper edge extends toward the extending portion 23. With this type of wall no water will be carried into the automobile and water flowing off the forward lower end of the swingable panel will be directed onto the draining surface of the extending portion 23.

Figure 7:
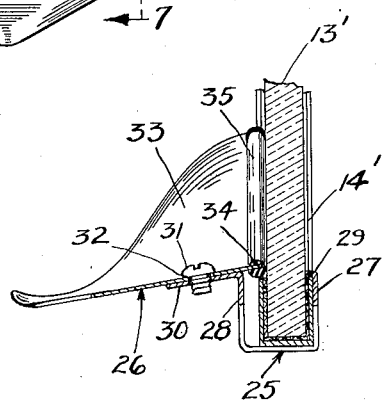
Figure 7 is a sectional view taken on line 7—7 of Figure 6 showing details and manner of mounting.
Figure 8:
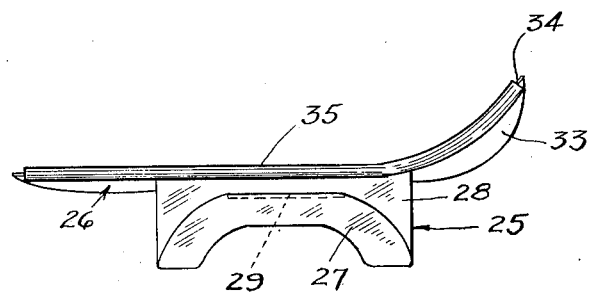
Figure 8 is a side view of the drain of Figure 6.

Referring to the drain disclosed in Figures 6, 7 and 8, such comprises a two-piece construction involving a U-shaped attaching channel member 25 and a drain member 26. The channel member has leg walls 27 and 28, the wall 27 being provided with a ledge 29 which is arranged to overlie the inside inner edge of the U-shaped frame 14' of the ventilating panel. The other leg wall 28 is provided with an extension 30 to which is attached the drain member 26 by means of two screws 31. The drain member has an adjusting slot 32 through which the screws extend.

The drain member 26 is constructed to have a general triangular shape with the forward end 33 curved upwardly to form a front sloping wall to prevent water from flowing off the forward end of the drain. The inner edge 34 of the drain member 26 is provided with a rubber beading 35, which beading is arranged to engage the glass pane of the swingable panel 13' just above the outside inner edge of the U-shaped frame 14', all as best indicated in Figure 7. Thus the beading and the inner edge of the drain member 26 will act as holding means for the leg wall 28 of the attaching channel 27 and thus hold the whole drain structure firmly on the swingable ventilating panel.

When the drain structure is attached and the ventilating panel is opened the drain member 26 will slope rearwardly and outwardly and thus direct water to the exterior of the vehicle body in the same manner as the one piece drain shown in Figures 1 to 5. The drain structure shown in Figures 6, 7 and 8 can be readily attached to all existing shapes of ventilating channels as the drain member 26 is attachable after the U-shaped attaching channel is positioned on the lower portion of the U-shaped frame 14' which, because of its construction, need not be slid on from the end of the U-shaped frame, but can be merely slipped upwardly from the bottom. When the drain member 26 is attached to the channel member by the screws, the rubber bead will have a snug fit against the glass and thus hold the entire drain structure attached. The drain member 26 can be adjusted so that the forward end thereof will lie just rearward of the forward portion of the panel frame 14'. The upper curvature of the forward end of the drain member is such that it can fit on any type of swingable panel, regardless of the sharpness of curvature at the lower forward end of the panel 13', or the position of the pivot for the panel.

From the foregoing description it is believed to be apparent that water from an open ventilating panel will be prevented from dripping into the interior of an automobile when it has associated therewith, in the manner shown, either of the drains embodying my invention. The drains are so constructed as to blend with the automobile body lines and can be made of such material and finish as to match either the body paint or the swingable panel frame. Where it is desired to have the drains incorporated as an original part of an automobile or other similar moving structure, it can be made so as to be a rigid part of the panel frame.

Although I have shown the drains as being associated with a front door ventilating panel, they can be associated with any other swinging panel employed for ventilating and wherein a portion is swung inwardly when the panel is open.

Being aware of the possibility of modifications in the particular structures disclosed without departing from the fundamental principles of my invention, I do not intend that the scope of the invention be limited in any manner except in accordance with the appended claims.

What is claimed is:

1. In combination with a ventilating panel swingable about a pivot to a position where the forward end portion projects into the interior of an occupant carrying body and establishes a space between said forward end and the body, a drain attached to the lower forward end of the panel and comprising a portion having a substantially flat drain surface sloping downwardly from the panel and being of such area and shape that it will cover the established space and its outer edge will extend to the exterior of the body when the panel is opened a considerable extent.

2. In combination with a ventilating panel swingable to a position where the forward end projects into the interior of an occupant carrying body, a drain attached to the lower forward end of the panel and comprising a portion having a drain surface sloping downwardly from the panel and extending to the exterior of the body when the panel is open, and a second portion forming an upwardly projecting wall at the forward end of the drain surface extending from a point adjacent the panel to a point adjacent the outer edge.

3. In a drain of the class described, a portion arranged to be connected to the lower forward end of a pivoted ventilating section of a vehicle window and an outwardly extending substantially flat portion providing a sloping drain surface of such area and shape as to extend between the end part of the ventilating section forward of the pivot and the exterior of the vehicle when the section is open to thereby cover the space established by the moving of the forward part of the section inwardly and receive water coming from said forward end of the section and drain it to the exterior of the vehicle.

4. In a drain of the class described, a portion arranged to be connected to the lower forward end of a pivoted ventilating section of a vehicle window, an outwardly extending portion providing a drain surface extending between the forward end of the ventilating section and the exterior of the vehicle when the section is open to thereby receive water coming from said forward end of the section and drain it to the exterior of the vehicle, and an upstanding portion providing a wall at the forward end of the drain surface and extending from the connecting portion to the outer edge of the drain surface.

5. In a drain of the class described for association with a pivoted ventilating panel of a vehicle, a portion arranged to be connected to the lower forward end of the pivoted ventilating panel, an outwardly extending portion having a substantially flat top drain surface continuously sloping downwardly to its edge in both an outwardly and rearwardly direction, and an upstanding portion providing a wall at the forward end of the drain surface extending from the connecting portion to the outer edge of the drain surface.

6. In a drain for attachment to the lower end of a vehicle body pivoted ventilating member the forward end of which is swingable inwardly, said drain comprising a member provided with a U-shaped portion for receiving a lower forward marginal portion of the ventilating member, a second portion extending outwardly therefrom and provided with a substantially flat drain surface sloping downwardly to its outer edge from the U-shaped portion, and a third portion extending upwardly at the forward end of the extending portion to provide a wall for the forward end of the drain surface extending from the U-shaped portion toward and substantially to the outer edge of the drain surface.

7. A drain for attachment to the lower end of a vehicle body pivoted ventilating member the forward end of which is swingable inwardly, said drain comprising a U-shaped portion provided with inwardly projecting attaching ledges at the upper ends of its legs for receiving the lower forward marginal portion of the ventilating member, a second integral portion extending from one leg and providing a drain surface sloping downwardly away from the leg and also rearwardly from its forward end and a third integral portion extending upwardly at the forward end of the second portion and outwardly along its forward edge to provide an end wall for the drain surface.

8. A drain for attachment to the lower end of a vehicle body pivoted ventilating member the forward end of which is swingable inwardly, said drain comprising a U-shaped portion provided with inwardly projecting attaching ledges at the upper ends of its legs for receiving the lower forward marginal portion of the ventilating member, a second portion extending from one leg and providing a relatively flat drain surface sloping downwardly away from the leg and also rearwardly from its forward end and a third portion extending upwardly at the forward end of the second portion to provide an end wall for the drain surface which extends outwardly toward its free outer edge, said third portion being provided with a top marginal section turned toward the drain surface and being higher adjacent the leg than at the free outer edge of the second extending portion.

9. In a drain of the class described for association with a pivoted ventilating section of a vehicle, a portion arranged to receive the lower marginal portion of the pivoted ventilating section, a second independent portion having a top drain surface for sloping outwardly, and means for connecting the second portion to the first portion and permitting adjustment of the former relative to the latter and in a direction parallel to the plane of the ventilating panel.

10. In a drain of the class described for association with a pivoted ventilating section of a vehicle, a portion arranged to be connected to the lower end of a pivoted ventilating section, a second independent portion having a top drain surface for sloping outwardly and an integral turned up portion at its forward end extending outwardly toward the outer edge of the drain surface, and means for connecting the second portion to the first portion and permitting adjustment of the former relative to the latter and in a direction parallel to the plane of the ventilating panel.

11. In a drain of the class described for association with a pivoted ventilating section of a vehicle, a U-shaped portion arranged to fit over the frame of the pivoted ventilating section and having an inturned ledge on one leg for engaging the inner part of the frame and an outwardly extending flange on the other leg, a second independent portion providing a drain surface, and detachable means connecting the second portion to the outwardly extending flange so that the inner edge of the said second portion will extend inwardly from the said second leg and provide a ledge for engaging the outer part of the frame.

12. In a drain of the class described for association with a pivoted ventilating section of a vehicle body, a U-shaped portion arranged to fit over the frame of the pivoted ventilating section and having an inturned ledge on one leg for engaging the inner part of the frame and an outwardly extending flange on the other leg, a second independent portion providing a drain surface, detachable means connecting the second portion to the outwardly extending flange so that the inner edge of the said second portion will extend inwardly from the said second leg and provide a ledge for engaging the outer part of the frame, and a yieldable sealing bead carried by the inner edge of the second portion.

13. In a drain of the class described for association with a pivoted ventilating section of a vehicle body, a U-shaped portion arranged to fit over the frame of the pivoted ventilating section and having an inturned ledge on one leg for engaging the inner part of the frame and an outwardly extending flange on the other leg, a second independent portion providing a top drain surface sloping outwardly and an upturned forward end, detachable means for connecting the second portion to the outwardly extending flange so that the inner edge of the second portion will extend inwardly from the said second leg and provide a ledge for engaging the outer part of the frame, means for permitting longitudinal adjustment of the second portion with respect to the U-shaped portion, and a rubber sealing bead carried by the inner edge of the second portion.

14. In a drain of the class described, a portion arranged to be connected to the lower forward end of a pivoted ventilating section of a vehicle window and an outwardly extending substantially flat portion providing a drain surface of such area and shape as to extend between the end part of the ventilating section forward of the pivot and the exterior of the vehicle when the section is open to thereby cover the space established by the moving of the forward part of the section inwardly and receive water coming from said forward end of the section and drain it to the exterior of the vehicle.

CARL C. KOELN.

REFERENCES CITED

The following references are of record in the file of this patent:

UNITED STATES PATENTS

| Number | Name | Date |
| --- | --- | --- |
| 2,029,978 | Andrews, Jr. | Feb. 4, 1936 |
| 2,119,635 | Griffith | June 7, 1938 |
| 2,224,433 | Holden | Dec. 10, 1940 |
| 2,290,449 | Ramsey | July 21, 1942 |
| 2,354,443 | Schirra | July 25, 1944 |